US012781944B2

(12) United States Patent
Joergensen

(10) Patent No.: US 12,781,944 B2
(45) Date of Patent: Nov. 3, 2026

(54) LIGHT FIXTURE WITH SCATTERING ELEMENTS

(71) Applicant: HARMAN PROFESSIONAL DENMARK APS, Aarhus N (DK)

(72) Inventor: Dennis Thykjaer Joergensen, Roende (DK)

(73) Assignee: HARMAN PROFESSIONAL DENMARK APS, Aarhus N (DK)

( * ) Notice: Subject to any disclaimer, the term of this patent is extended or adjusted under 35 U.S.C. 154(b) by 0 days.

(21) Appl. No.: 19/409,410

(22) Filed: Dec. 4, 2025

(65) Prior Publication Data

US 2026/0177224 A1 Jun. 25, 2026

(30) Foreign Application Priority Data

Dec. 19, 2024 (EP) .................................... 24221553

(51) Int. Cl.
*F21V 5/00* (2018.01)
*F21V 5/04* (2006.01)
*F21W 131/406* (2006.01)
*F21Y 103/33* (2016.01)
*F21Y 115/10* (2016.01)

(52) U.S. Cl.
CPC ................ *F21V 5/002* (2013.01); *F21V 5/04* (2013.01); *F21W 2131/406* (2013.01); *F21Y 2103/33* (2016.08); *F21Y 2115/10* (2016.08)

(58) Field of Classification Search
CPC . F21V 3/049; F21V 5/002; F21V 5/04; F21V 5/048; F21Y 2107/10
See application file for complete search history.

(56) References Cited

U.S. PATENT DOCUMENTS

| | | | | |
|---|---|---|---|---|
| 6,443,582 | B1 * | 9/2002 | Tarne | F21S 43/245 362/555 |
| 11,846,413 | B2 | 12/2023 | Joergensen | |
| 2002/0093829 | A1 | 7/2002 | Pinson et al. | |
| 2005/0002190 | A1 * | 1/2005 | Kramer | F21S 10/02 362/236 |
| 2011/0175527 | A1 * | 7/2011 | Ramer | F21V 3/02 315/32 |
| 2022/0065410 | A1 * | 3/2022 | Huang | F21S 8/026 |
| 2022/0341565 | A1 | 10/2022 | Rasmussen et al. | |
| 2023/0288043 | A1 | 9/2023 | Peard et al. | |
| 2023/0296229 | A1 * | 9/2023 | Chaimberg | F21V 21/04 362/404 |
| 2024/0401778 | A1 * | 12/2024 | Stanek | F21V 14/02 |

FOREIGN PATENT DOCUMENTS

EP 1 489 351 A1 12/2004

* cited by examiner

*Primary Examiner* — Alexander K Garlen
(74) *Attorney, Agent, or Firm* — Artegis Law Group, LLP

(57) ABSTRACT

The disclosure provides a light fixture comprising at least one first light source configured to emit a main light beam in a main light emission direction, and a front lens configured to guide the main light beam at an exit surface where the main light beam exits the light fixture. A plurality of second light sources (300) near the front lens are provided configured to illuminate the front lens with a plurality of second light beams, wherein the front lens comprises a lens body in which at least one channel is provided, the at least one channel comprises a plurality of scattering elements, wherein the plurality of second light sources are configured to illuminate the plurality of scattering elements.

15 Claims, 3 Drawing Sheets

LIGHT FIXTURE WITH SCATTERING ELEMENTS

CROSS REFERENCE TO RELATED APPLICATIONS

This application claims priority benefit to European Patent Application Number 24221553.1 entitled "LIGHT FIXTURE WITH SCATTERING ELEMENTS," filed Dec. 19, 2024. The subject matter of this related application is hereby incorporated herein by reference.

BACKGROUND

Field of the Various Embodiments

The present application relates to a light fixture and especially relates to a moving head light fixture.

DESCRIPTION OF THE RELATED ART

Light fixtures such as moving head light fixtures are commonly known in the art of lighting and especially in connection with entertainment lighting. Typically, a moving head light fixture comprises a head including a number of light sources which create a light beam and a number of light effect elements are provided adapted to control the light beam and to create various light effects. A moving head light fixture offers a large range of possibilities for lighting and it is possible to have various light effects which are obtained with a main light beam emitted by the light fixture. Common light effect obtained with a moving head light fixture include a pan and tilt describing the basic movement of the moving head light. Furthermore, by adjusting the lens or aperture a moving head light fixture can be focused onto a specific point or unfocused to create a wider beam angle. Furthermore, colour changing capabilities can be provided allowing for smooth transitions between different hues and shades. Finally a gobo effect is possible where a template can be placed in front of the light source to create a specific pattern or image.

However there is a need to further improve the possibilities for light effects that can be generated with a light fixture such as a moving head light fixture or any other light fixture emitting a main light beam.

SUMMARY

This need is met by the features of the independent claim. Further aspects are described in the dependent claims.

According to a first aspect a light fixture is provided comprising at least one first light source configured to emit a main light beam in a main light emission direction. The light fixture furthermore comprises a front lens configured to guide the main light beam at an exit surface where the main light beam exits the light fixture. Furthermore, a plurality of second light sources are provided located outside the main light beam and configured to illuminate the front lens with a plurality of second light beams. The front lens comprises a lens body in which at least one channel is provided and the at least one channel comprises a plurality of scattering elements wherein the plurality of second light sources are configured to illuminate the plurality of scattering elements.

With the illumination of the scattering elements different new light effects can be generated. The main light beam generates a first light effect and in addition a further light effect is obtained by the second light sources illuminating the scattering elements provided in the at least one channel. The different effects can be controlled independently from one another and a variety of different effects are possible. The second light sources can illuminate the front lens with the main light beam being present or can illuminate the front lens when the main light beam is turned off.

Preferably the plurality of scattering elements were generated in the front lens with subsurface laser engraving, SSLE. Subsurface laser engraving is a marking technology using lasers to create permanent marks, used as scattering elements beneath the surface of the body where the scattering elements are built. This method enables the creation of complex designs and patterns within the material itself and with the use of the second light beams a variety of different light effects visible to a user can be generated. In the realm of subsurface laser engraving the phenomenon of eye candy effect is also known as with this technology the creation of visibly striking, colourful patterns or images within the front lens being engraved can be obtained.

Other devices, systems, methods, features and advantages will be or will become apparent to one with skill in the art upon examination of the following detailed description and figures. It is to be understood that the features explained above or features yet to be explained below can be used not only in the respective combinations indicated, but also in other combinations or in isolation without departing from the scope of the present application.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
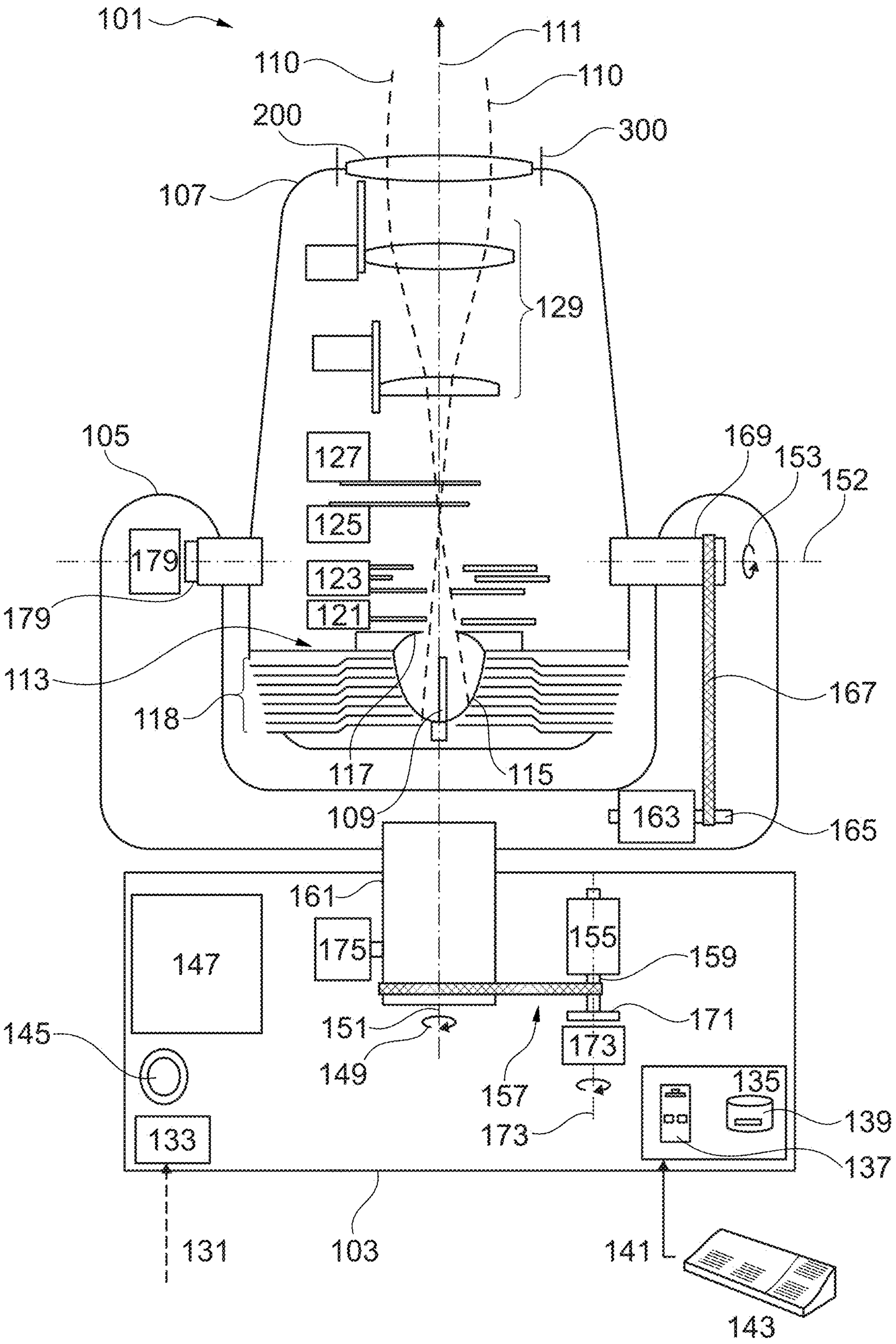
FIG. 1 shows a schematic overview of a light fixture incorporating a front lens with which additional light effects can be achieved.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 is a structural diagram illustrating a moving head light fixture 101. The moving head light fixture 101 comprises a base 103 rotatable connected to a yoke 105 and a head 107 rotatable carried in the yoke. The head comprises at least one first light source 109 which generates a light beam 110 propagating along an optical axis which is a main light emission direction 111. The light fixture 101 furthermore comprises a front lens 200 illuminated by light sources 300 wherein the combination of the structure of the front lens 200 and the light sources 300 is used to generate additional light effects as will be explained below.

The light source 109 is arranged in a lamp reflector and cooling system 113 comprising a main reflector 115 wherein the light source 109 is arranged, a retro reflector 117 arranged outside off and facing the main reflector. The reflector and cooling system comprises also a number of cooling fins 118 adapted to dissipate heat from the light source and a number of blowers (not shown) are adapted to blow air through openings between the cooling fins. The light is directed along the optical axis by the reflector system and passes through a number of light effects before exiting the head through the front lens 200. The light effects can for instance be any light effects known in the art of lighting systems for instance a dimmer 121, a CMY color mixing system 123, color filters (not shown), gobos 125, animation effects 127, focus and zoom system 129, prism effects (not shown), framing effects (not shown), iris effects (not shown) or any other light effects known in the art of entertainment lighting. It is noted that more, fewer or no light effects may be comprised in the moving head and that any number and types of light sources can be used. The light source 109, arranged inside the head of the moving head light fixture, can be any light source, including, but not limited to, incandescent lamps, discharge lamps, plasma lamps, LEDs, OLEDs, PLEDS, Lasers, laser activated Phosphor, etc. or any combination thereof. As will be discussed below in connection with FIGS. 2 to 4 in more detail, second light sources 300 are provided which illuminate the front lens substantially perpendicular to the main light emission direction, and especially illuminate scattering elements provided within the front lens.

The moving head light fixture receives electrical power 131 from an external power supply (not shown). The electrical power is received by an internal power supply 133 which adapts and distributes electrical power through internal power lines (not shown) to the subsystems of the moving head and can be constructed in many different ways. The light fixture comprises also a controller 135 typically comprising processing means 137 and memory means 139. The controller controls the other components (other subsystems) in the light fixture based on an input signal 141 indicative light effect parameters, position parameters and other parameters related to the moving head lighting fixture. The controller receives the input signal from a light controller 143 as known in the art of intelligent and entertainment lighting for instance by using a standard protocol like DMX, ArtNET, RDM etc, however any other communication protocol suitable for communication control commands can also be used. Typically the light effect parameter is indicative of at least one light effect parameter related to the different light effects in the light system. The central controller is adapted to send commands and instructions to the different subsystems of the moving head through internal communication lines (not shown). The internal communication system can be based on a various type of communications networks/systems.

The moving head light fixture 101 can also have user input means enabling a user to interact directly with the moving head light fixture instead of using a light controller 143 to communicate with the moving head light fixture. The user input means 145 can for instance be bottoms, joysticks, touch pads, keyboard, mouse etc. The user input means can also be supported by a display 147 enabling the user to interact with the moving head light system through a menu system shown on the display and by using the user input means 145. The display device and user input means can in one embodiment also be integrated as a touch screen.

The moving head light fixture comprises rotating means adapted to rotate at least at the yoke 105 in relation to the base 103 or the head 107 in relation to the yoke 105. As indicated by arrow 149 the yoke can rotate both ways around a yoke axis 151 and the head can rotate both ways around a head axis 152 as illustrated by arrow 153.

In the illustrated embodiment the rotating means comprises a yoke actuator 155 adapted to rotate the yoke 105 around the yoke axis 149 and in relation to the base 103 through a mechanical yoke drive mechanism 157. The yoke actuator comprises and drives a yoke actuator axel 159. The yoke actuator axel 159 interacts with the mechanical yoke drive mechanism 157, which is connected to a yoke shaft 161. The yoke shaft 161 is rotatable connected to the base through a bearing (not shown) and fixed in relation the yoke whereby the yoke can rotate around the yoke axis and in relation to the base.

In a similar way the rotating means comprises a head actuator 163 comprising and driving a head actuator axel 165. The head actuator axel interacts with the mechanical head drive mechanism 167, which is connected to a head shaft 169. The head shaft is rotatable connected to the yoke through a bearing (not shown) and fixed in relation the head whereby the head can rotate around the head axis 152 and in relation to the yoke. In the illustrated embodiment the head comprises two head shafts, which are rotatable, connected to the two upstanding legs of the yoke and the head actuator and head drive mechanism interacts with one of the head shafts.

The skilled person realizes the mechanical yoke and head drive mechanism can be constructed in many different ways using mechanical components such as, shafts, gears, cables, chains, belts, transmission systems, bearings etc. However as an example the yoke and yoke drive mechanism comprises a belt which interacts with a toothed yoke axel wheel and a toothed yoke shaft wheel. Similar the head drive mechanism 167 comprises a belt which interacts with a toothed head axel wheel and a toothed head shaft wheel.

As will be discussed below in connection with FIGS. 2 to 4, the light fixture 101 comprising the front lens 200 and the second light sources 300 can generate an eye candy effect which is created by looking through the front lens onto the light fixture. This becomes possible as scattering defects, i.e. scattering elements 211 are placed in planes approximately parallel to the main light emission direction 111. As a consequence only a small fraction of the primary beam is either scattered or if the planes comprising the scattering elements are covered by an opaque material facing the first light source 109, a scattering of the light emitted by the first light sources can be avoided. The amount of light emitted back into the light fixture is comparatively small, as can be deduced from the discussion below. The idea is to use the 3D subsurface laser engraving, SSLE, to generate designed patterns of scattering centers or scattering elements in the front lens 200. The scattering elements 211 can be used to generate designed and distinct visual effects and appearances.

Figure 2:
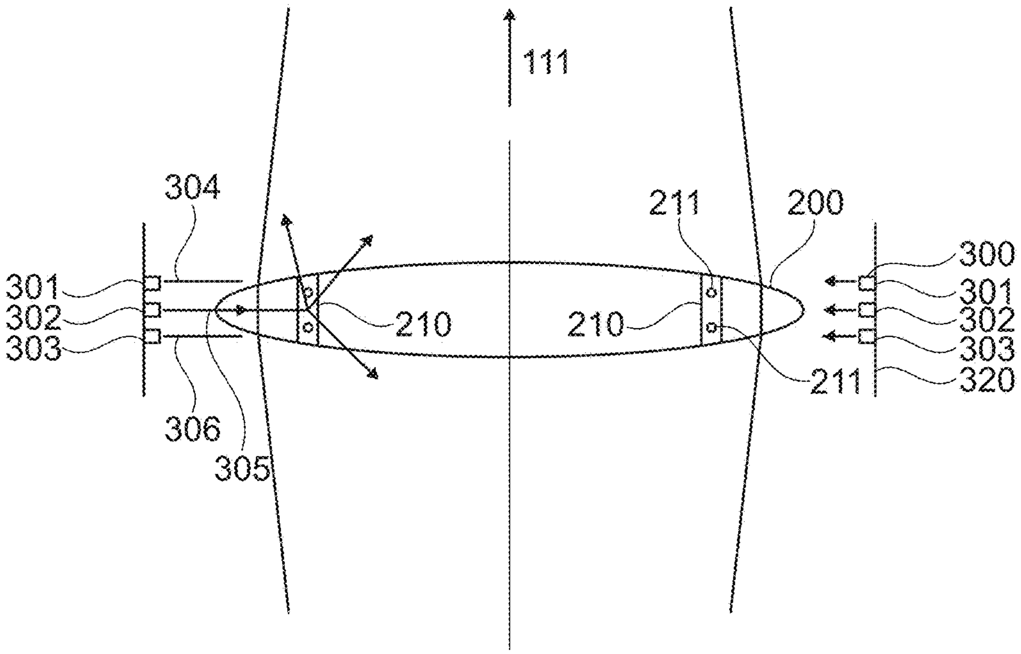
FIG. 2 is a more detailed view of the front part of the light fixture of FIG. 2 showing the front lens and the additional light fixtures used for the additional scattering effect.

Referring especially to FIG. 2 an enlarged view of the front part of the light fixture 101 is shown comprising the front lens 200 and the second light sources 300 which can illuminate the side surface from the front lens 200. The front lens 200 comprises channels 210 extending parallel to the main light emission direction 111 and in each of the channels one or several scattering elements 211 are provided. As shown in FIG. 2 the different scattering elements 211 are arranged along a line parallel or tangential to the main light emission direction so that the scattering obtained by the light of the main light beam includes only small fraction of the light emitted by the first light source 109 and guided in the main light emission direction. The ratio of light hitting the channels 210 and the scattering elements compared to the overall surface of the area through which the main light beam can exit the light fixture could be in the range of 1 to 5%, 1-10% or 1-15%.

The scattering elements are generated within the front lens 200 using SSLE, where high-powered lasers are used to create permanent marks beneath the surface of the lens. The laser delivers precise pulses of energy coming from different direction focusing and meeting at a location where the scattering element should be generated. The focused laser beam directed at the specific point beneath the surface creates a micro explosion that vaporizes a small volume of material so that a plasma is created including ions and free electrons and as the plasma expands it cools forming a void or cavity within the material. This process can then be repeated multiple times to create either different designs or simply the small scattering elements 211. The designs can include densely created scattering elements or centers forming seaming and continuous complex 3D shapes of scattering shapes in the front lens.

Figure 3:
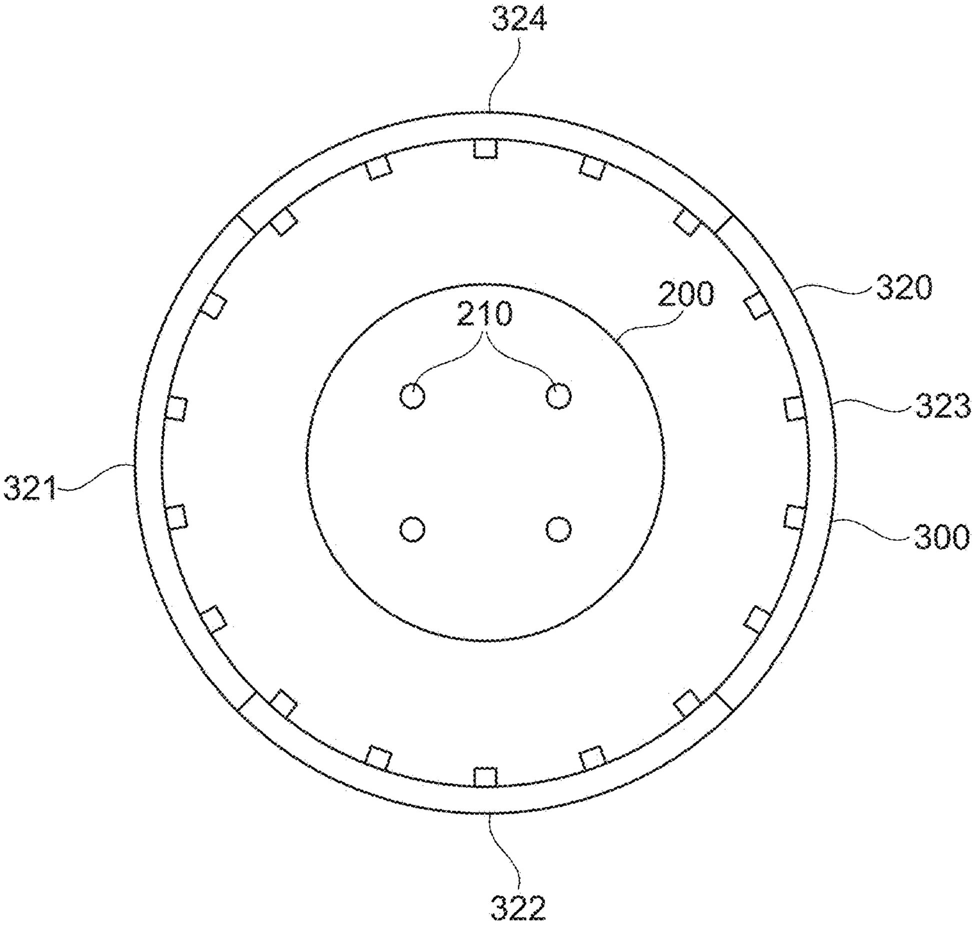
FIG. 3 shows a schematic top view of the front lens and the light sources of the situation shown in FIG. 3.
Figure 4:
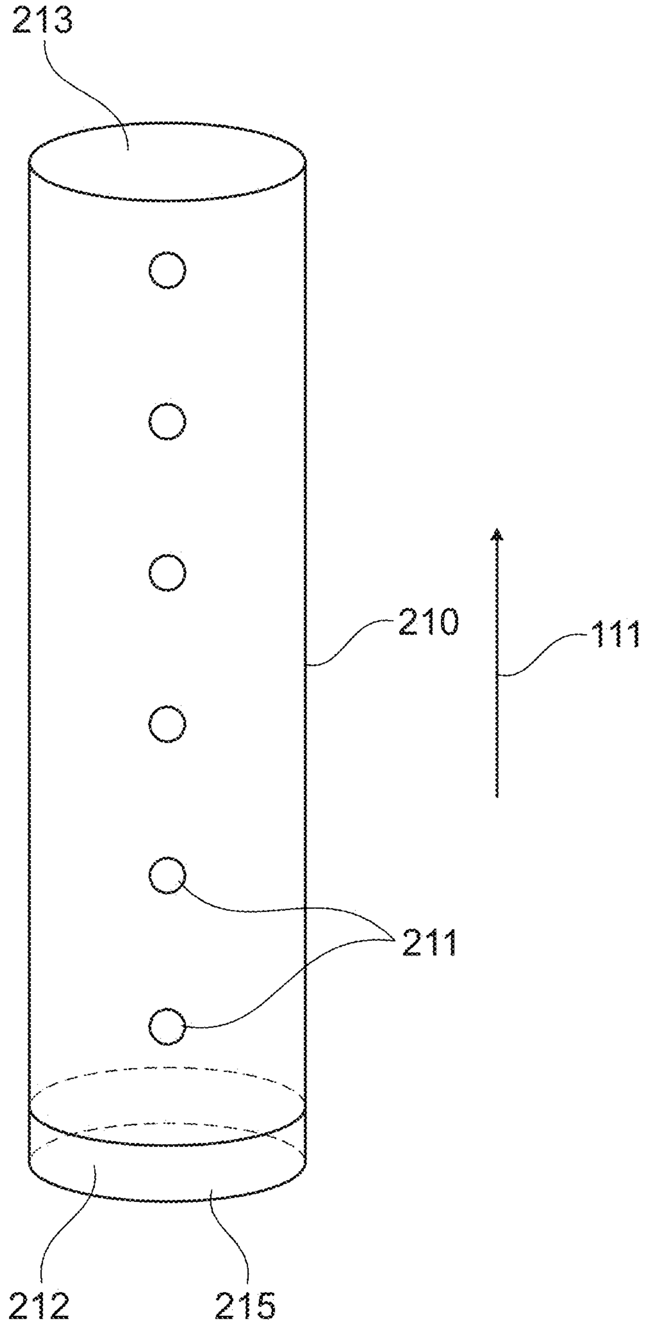
FIG. 4 shows a schematic view of a channel provided in the front lens including the scattering elements.

As shown especially in FIG. 4 the scattering elements can be arranged along a line preferably but not exclusively parallel to the main light emission direction. Referring again to FIGS. 2 and 3, a ring 320 is provided around the front lens providing a support structure for the light sources 300. The light sources 300, arranged in a way surrounding the front lens 200 of the moving head light fixture, can be any light source, including, but not limited to, incandescent lamps, discharge lamps, plasma lamps, and are preferably implemented as LEDs, OLEDs, PLEDS, etc. or any combination thereof.

The light sources 300 are arranged such that they illuminate the front lens, from a side location not located in the main light beam. The second beams from the light sources 300 can extend in a direction substantially perpendicular to the main light emission direction 111, however larger angles between app. 45 and 135 degrees relative to the main light emission direction 111 are possible. In the embodiment shown in FIG. 2 three different rings of light sources 300 are arranged parallel to the main light emission direction. Accordingly the second light sources 301 are arranged on a ring around the front lens 200, a second ring of light sources 302 is arranged at another height relative to the front lens and a third ring of light sources 303 is arranged, each of the second light sources 301 to 303 illuminating the front lens from a lateral side. It should be understood that only a single ring of light sources could be used, 2 or 3 rings or even more than 3 rings of light sources 300.

FIG. 3 shows a top view of the front lens 200 and the ring 320 including the second light sources 300. The number of light sources arranged around the circumference of the rings 320 can vary and each of the light sources can include light sources of different color such as red, green, blue and white and any combination thereof. In the embodiment shown in FIG. 3 four different channels 210 are shown distributed within the front lens 200, but it should be understood that any number of channels including the scattering elements could be provided. Referring again to FIG. 2 it can be seen that the light beams such as beams 304, 305, 306 emitted by the second light sources here light beam 305 emitted by light source 302 is scattered at one of the scattering elements 211 and is redirected in different directions not parallel to the main light emission direction 111. As a consequence different visual effects can be obtained depending on which of the light beams arranged on the rings 320 are used to illuminate the scattering elements, which color is used and at what height the light source 301, 302 or 303 is located relative to the front lens 200. The beams 304 to 306 can have an angle relative to the main light emission direction between 45 and 135 degrees, preferably between 80 and 100 degrees.

In FIG. 3 the ring architecture including the light sources 300 are shown in further detail and the ring or especially the light sources provided on the ring can be arranged in different sections 321 to 324 of the ring 320 and each of the light sources 300 can be controlled individually or sectionwise. By way of example only the light sources in section 322 may be illuminated, or the light sources arranged in section 322 and 324 etc. By controlling, using a controller such as controller 135, each of the light sources 300 individually or in a common way for each of the sections 321 to 324 a variety of different light effects can be obtained. Furthermore, other groupings of the light sources provided on the ring 320 are possible, e.g. a group comprising every second light source arranged along the ring or every n-th light source, with n being between 2 and 10. The light sources can also be controlled in order to obtain time varying effects by which the activation of the different light sources moves around the ring, e.g. in waves of intensity and/or color.

The second light sources 300, considering the direction of the main light emission direction 111 can be located at the height of the front lens such as the light sources 302. However they may also be arranged slightly behind or in front of the front lens as light sources 301 or 303. Accordingly different inclination angles for the second light beams such as light beams 304, 304, 305 or 306 relative to the front lens or the main light emission direction and the scattering elements 211 are obtained. As a consequence different light effects and visual appearances can be obtained for a user looking at the light fixture 101, especially when the first light source is not turned on and only some of the second light sources 300 are turned on. It is possible to obtain different patterns such as a pattern simulating stray light similar to a Fresnel fixture. This could be obtained with rings or cylinders of densely packed scattering centers placed in a pattern similar to the top rings and grows in a Fresnel lens.

As shown in FIG. 4 the channel 210 comprises, in the direction of the main light emission direction, an entrance or lower surface 212 and an exit or upper surface 213. At the lower surface 212 facing the primary light source a cover 215 of a material such as silk printed which is not transparent to the light from the light sources 109 can be provided. Furthermore the cover 215 could be obtained by applying metallic or mirror coatings at the lens surface at the appropriate regions at an end surface facing the first light sources. As a consequence the primary light beam does not enter the channel 210 and a scattering at the scattering elements 211 is avoided with the light of the main light beam. The cover 215 is an optional feature and may be provided or not depending on whether scattering effects through the main light beam are desired or should be avoided. In the embodiments shown in FIGS. 2 to 4, only one scattering element is provided in a corresponding channel 210 at a certain position or height when looking in the main light emission direction. It is also possible that several scattering elements are arranged within a single channel 210 at the same height. Furthermore, the channels could also include any patterns of scattering elements possible with the technology of SSLE. The channel 210 can extend, in the main light emission direction, over the whole thickness of the front lens. The channel 210 can also extend over a range smaller than the thickness of the front lens. Further the scattering elements could be densely packed forming a continuous 3-D shape such as a ring cylinder or any other shape.

From the above some general conclusions can be drawn:

The scattering elements are preferably generated in the front lens with subsurface laser engraving. This technology provides a controlled way how the scattering elements having a size down to 20 to 40 micrometers (μm) and a resolution between 800-1200 dpi (dots per inch) can be placed within the front lens at desired positions.

The plurality of second light sources 300 are preferably located outside the main light beam on the ring surrounding the front lens such as ring 220 surrounding the front lens 200.

Furthermore the second light sources 300 preferably emit the light beams in a angle relative to the main light beam between 45 and 135 degree, or preferably perpendicular or substantially perpendicular to the main light beam or main light emission direction. This can mean that the angle between the main light emission direction 111 and the second light beams 304 to 306 is between 45 and 135 degree, preferably, between 80 and 100 degree and more preferably between 85 and 95°.

Within each of the channels 210 the plurality of scattering elements 211 are preferably located along a line or axis parallel to the main light emission direction. This keeps the scattering by the main light beam low while providing an illumination through the second light sources 300 emitting the light in a direction perpendicular to the main light emission direction.

As shown inter alia in FIG. 4 the channel, in direction of the main light emission direction can include an entrance or lower surface 212 and at an opposite end an exit surface 213 and the entrance surface 212 may be covered with an opaque cover 215 which keeps the light from the main light beam from entering the at least one channel 210.

The front lens 200 can comprise a plurality of channels 210 and each of the plurality of channels 210 is mainly parallel to the main light emission direction wherein each of the channels comprises a plurality of scattering elements 211.

Furthermore each of the scattering elements can comprise a scattering surface which is mainly tangential to the main light emission direction.

The light fixture can be a moving head light fixture with a base, a yoke and a head wherein the front lens is provided in the head. However, it should be understood that any other light fixture could be used to comprising a front lens.

Preferably the second light sources are implemented as LEDs.

The ring 320 can furthermore comprise different ring sections such as sections 321 to 324 and the second light sources located on a corresponding ring section can be controlled either individually or all light sources located on a corresponding ring section are controlled in a same way so that a control per ring section is provided. The light fixture can further include a controller configured to control each of the second light sources individually or group wise, each group comprising a subset of the plurality of second light sources.

Furthermore it is possible, that the second light sources are located around the front lens. In addition, the at least one channel in the front lens such as channel 210 extends substantially parallel to the main light emission direction.

Summarizing with the principle discussed above, new lighting effects can be achieved.

What is claimed is:

1. A light fixture comprising:

at least one first light source configured to emit a main light beam in a main light emission direction;

a front lens configured to guide the main light beam at an exit surface where the main light beam exits the light fixture; and a plurality of second light sources located at the front lens outside the main light beam and configured to illuminate the front lens with a plurality of second light beams, wherein the front lens comprises a lens body in which at least one channel is provided, the at least one channel comprising a plurality of scattering elements, wherein the plurality of second light sources are configured to illuminate the plurality of scattering elements.

2. The light fixture of claim 1, wherein the plurality of scattering elements were generated in the front lens with sub-surface laser engraving.

3. The light fixture of claim 1, wherein the plurality of second light sources are located outside the main light beam on a ring surrounding the front lens.

4. The light fixture of claim 3, wherein the ring comprises different ring sections and the second light sources provided on a corresponding ring section are controllable per ring section.

5. The light fixture of claim 1, wherein the plurality of second light sources emit the second light beams in an angle of 45 to 135 degrees relative to the main light beam.

6. The light fixture of claim 1, wherein the plurality of second light sources emit the second light beams in an angle of 80 to 100 degrees relative to the main light beam.

7. The light fixture of claim 1, wherein in the at least one channel, the plurality of scattering elements are located along an axis parallel to the main light emission direction.

8. The light fixture of claim 1, wherein the at least one channel, in direction of the main light emission direction, comprises an entrance surface facing the first light source and an exit surface, wherein the entrance surface is covered with an opaque cover configured to keep light from the first light source from entering the at least one channel.

9. The light fixture of claim 1, wherein the front lens comprises a plurality of channels, with each of the plurality of channels being parallel to the main light emission direction and each of the plurality of channels comprising a respective plurality of scattering elements.

10. The light fixture of claim 1, wherein each of the plurality of scattering elements comprises a scattering surface tangential to the main light emission direction.

11. The light fixture of claim 1, wherein the light fixture is a moving head light fixture comprising a base, a yoke connected to the base and a head connected to the yoke, wherein the front lens is provided in the head.

12. The light fixture of claim 1, wherein the second light sources include light emitting diodes (LEDs).

13. The light fixture of claim 1, further comprising a controller configured to control each of the second light sources individually or group wise, each group comprising a subset of the plurality of second light sources.

14. The light fixture of claim 1, wherein the second light sources are located around the front lens.

15. The light fixture of claim 1, wherein the at least one channel extends substantially parallel to the main light emission direction.

* * * * *